United States Patent
Iacovella

(12) 
(10) Patent No.: US 6,199,583 B1
(45) Date of Patent: Mar. 13, 2001

(54) SAFETY GAS VALVE

(76) Inventor: Fulvio Iacovella, 2724 E. County Line Rd., Ardmore, PA (US) 19003

( * ) Notice: Subject to any disclaimer, the term of this patent is extended or adjusted under 35 U.S.C. 154(b) by 0 days.

(21) Appl. No.: 09/421,205

(22) Filed: Oct. 21, 1999

(51) Int. Cl.[7] .................................................. F16K 15/00
(52) U.S. Cl. .............................. 137/513.3; 137/543.21; 137/14
(58) Field of Search ....................... 137/513.3, 513.5, 137/543.21, 14

(56) References Cited

U.S. PATENT DOCUMENTS

| | | | |
|---|---|---|---|
| 821,859 | * 5/1906 | Clegg ................................. | 137/513.3 |
| 2,676,613 | * 4/1954 | Baxter ............................... | 137/513.3 |
| 3,146,792 | * 9/1964 | Donnelly et al. ................. | 137/513.3 |
| 3,194,255 | * 7/1965 | Flaton et al. ..................... | 137/513.3 |
| 3,275,145 | * 9/1966 | Jacobellis ......................... | 137/513.3 |
| 3,548,868 | * 12/1970 | Mullaney, III ................... | 137/543.21 |
| 3,794,077 | * 2/1974 | Fanshier ............................ | 137/513.3 |
| 4,080,988 | * 3/1978 | Robertson ......................... | 137/513.3 |
| 4,328,827 | * 5/1982 | Enjolras ............................ | 137/513.3 |
| 4,474,189 | * 10/1984 | Brown ............................... | 137/513.3 |
| 4,637,430 | * 1/1987 | Scheffel et al. .................. | 137/543.21 |
| 4,693,270 | * 9/1987 | Yaindl ............................... | 137/513.3 |
| 5,924,438 | * 7/1999 | Cimminelli et al. ............. | 137/513.3 |

FOREIGN PATENT DOCUMENTS

| | | | |
|---|---|---|---|
| 207640 | * 5/1958 | (DE) | ................................. 137/513.3 |

* cited by examiner

*Primary Examiner*—Gregory L. Huson
(74) *Attorney, Agent, or Firm*—Richard L. Huff

(57) ABSTRACT

A safety gas valve for hoses feeding gas-powered equipment. The valve is in the form of a separate unit which may be permanently or temporarily connected to a flexible hose, which hose has a proximal end and a distal end. The flexible hose is connected to a source of compressed gas through a quick-disconnect valve and a primary conduit. The safety gas valve contains a casing which has a seat. The safety gas valve contains a plunger having a surface capable of fitting to the seat to divide the safety gas valve into a distal compartment and a proximal compartment. The plunger or the casing wall has a discharge orifice running from the distal compartment to the proximal compartment. The safety gas valve may contain a resilient mechanism proximal to the plunger. When air or other gas flows distally through the valve, the plunger is moved distally and gas is allowed to flow freely distally. If the pressure proximal to the valve is suddenly released due to disconnection of the flexible hose from the primary conduit, at or adjacent to the quick-disconnect valve, the force of gas pressure in the flexible hose distal to the safety gas valve forces the plunger against the seat to prevent the rapid release of gas and thus prevent the loud noise and the whipping of the flexible hose usually associated with loss of pressure. The discharge orifice allows the pressure in the flexible hose distal to the valve to slowly reduce to atmospheric pressure.

20 Claims, 6 Drawing Sheets

SAFETY GAS VALVE

BACKGROUND OF THE INVENTION

1. Field of the Invention

This invention is directed to a valve device for use in pressurized flexible hoses to automatically prevent forceful escape of air or other gas from the hose if it becomes disconnected from the primary conduit and then to allow slow release of this gas to gradually return the pressure in the hose to atmospheric pressure. Thus, the noise and whipping action usually associated with sudden loss of pressure in gas hoses is eliminated.

2. Description of the Related Art

The prior art is aware of pneumatic systems which are made up of a source of pressurized gas, usually air, in combination with a primary gas conduit which is detachably connected to a flexible hose by means of a quick-disconnect valve. The downstream or distal end of the flexible hose is connected to an air-powered tool. In such systems of the prior art, disconnection of the flexible hose from the primary gas conduit causes a loud noise which can be harmful to hearing. Also, this rapid decrease in pressure can lead to whipping or lashing of the end of the flexible hose that has become disconnected from the primary conduit. The present invention is designed to eliminate these hazards existing in the prior art systems.

The prior art is also aware of valves which allow the passage of pressurized gas in a distal direction and prevent the sudden backflow of pressurized gas upon elimination of the pressure upstream of the valves. Thus, Great Britain Pat. No. 6738 to Burgess et al published Mar. 30, 1909 discloses a stem fitted with a spring and a plunger having a bypass hole therein to prevent the sudden loss of steam pressure but to allow a gradual reduction in pressure. The spring may be omitted and the device may be operated by gravity. The valve device of this patent is required to be approximately twice the size of the steam conduit and requires the presence of an elongated stem in order to maintain the plunger in proper alignment. U.S. Pat. No. 821,859 to Clegg also teaches a valve which allows air flow in a distal direction. This valve contains a plunger which abuts with a tapered seat. The plunger contains a port running the length of the plunger. When air pressure and the spring force the plunger distally, air flows freely. Upon loss of air pressure upstream of the valve, the plunger is forced against the tapered seat to eliminate sudden loss of pressure downstream of the valve, Air flowing through the port allows a gradual return of the downstream pressure to atmospheric pressure. This valve requires a long axial stem to maintain the alignment of the plunger and, as a consequence, the valve must be bulky. This is suitable for railroad braking systems disclosed in the patent but would not be amenable for the operation of pneumatic powered tools where lightness of weight and smallness of size are essential. Neither of these prior art references addresses the safety problems caused by loud noise and whipping ends of hoses when the hoses suddenly become disconnected from a pressure source.

SUMMARY OF THE INVENTION

The present invention has for its purpose the elimination of the unsafe results in the form of loud noise and whipping of the hose caused by the sudden reduction of air or other gaseous pressure in a system containing a source of pressurized gas, a primary gas conduit, at least one flexible hose connected to the primary gas conduit by means of a quick-disconnect valve, and a gas-powered device. The loud noise and whipping is caused by the pressure in the hose being released suddenly. This improved safety is brought about by the use of a unique safety gas valve specifically designed for this system. The valve, which contains a wall, may be a permanent attachment to a flexible hose or it may be a separate unit capable of being attached to a flexible hose. The valve contains a positioning washer, a plunger removably or permanently connected to, or unified with, the positioning washer, and a seat, preferably tapered, in the wall,. The plunger contains a proximal surface which fits snugly against the seat to form a distal compartment and a proximal compartment in the valve device. There is a discharge orifice running through the plunger or the wall of the casing. Under normal operating conditions, with gas passing distally through the valve, the plunger is held away from the valve seat by the resilient means and the pressure created by the flow of gas. When the flexible hose becomes disconnected from the air supply, the pressure upstream of the valve decreases suddenly, and the downstream pressure forces the valve shut to prevent the loud noise and whipping common in the prior art systems. Gas which is downstream from the valve then passes slowly through the discharge orifice to equalize the pressure upstream and downstream from the valve. During routine use of the system, air flow through the valve is not always constant, but can fluctuate widely. This can cause unnecessary motion of the plunger assembly inside the valve body thereby shortening the useful life of the device. In order to prevent this condition, the valve may contain a support piece connected to the wall and a resilient device distal to the support piece. This resilient device helps to stabilize the plunger assembly and thus prevent premature deterioration of the device.

DESCRIPTION OF THE PREFERRED EMBODIMENTS

The invention will now be described with reference to the above Figures. Like numerals refer to like features throughout the description.

Figure 11:
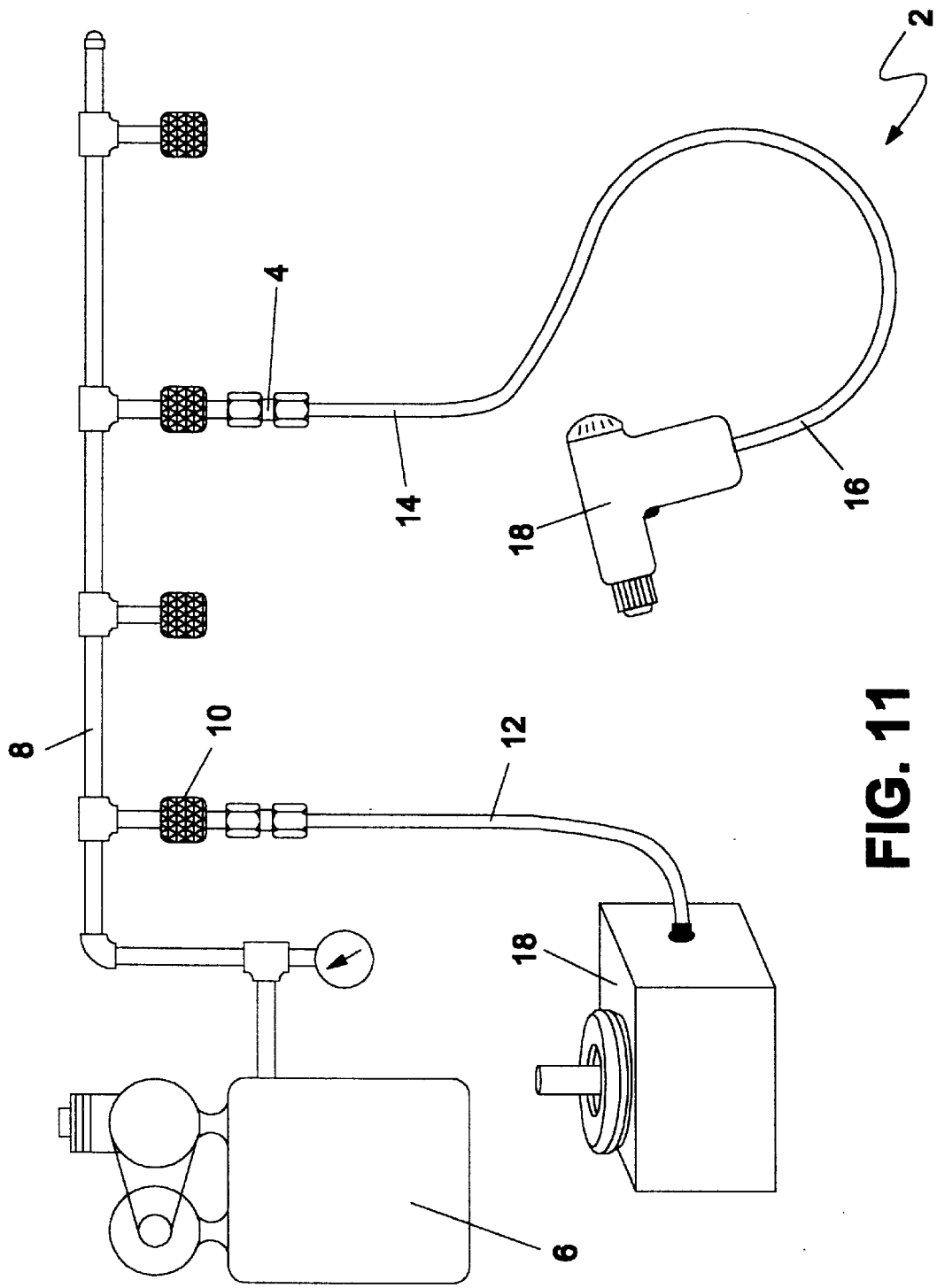
FIG. 11 is a diagrammatic view of the pneumatic system of this invention.

With reference to FIG. 11 showing the system 2 of the invention, the safety valve 4 is designed for use with a combination comprising a source 6 of compressed gas, preferably air; a primary conduit 8 for carrying the compressed gas; a quick-disconnect valve 10; at least one flexible hose 12 having a proximal (upstream) end 14 and a distal (downstream) end 16; and a gas-powered device 18 located at the distal end 16 of the flexible hose 12. The primary conduit 8 may be a pipe or a hose. Preferably the gas-powered device 18 is a tool with a reciprocating linear component or a rotating component. The gas-powered device is operated by applying the gas-powered device to a piece to be worked on and turning on the device 18. Examples of gas-powered devices 18 useful in this invention are tire changing machines and air nozzles. Other examples are tools which have distal ends and have reciprocating linear components or rotating components on the distal ends. Such tools may be pneumatic wrenches, sanders, drills, screw drivers, polishing machines, pneumatic chisels, and orbital sanders.

With reference to FIGS. 1–10, the safety gas valve 4 of the present invention contains an outer casing 20 which is a distinct member capable of removable or permanent attachment to a flexible hose 12. Removable attachment is accomplished by means of friction or threads 22. Permanent attachment can be accomplished by means of a barbed fitting 24 on the distal end 26 of the safety gas valve 4 and a crimping ring 28 to hold the hose 12 onto the barbed fitting 24. The outer casing 20 has a proximal end 30 and a distal end 26 and comprises a wall 32 forming an internal passageway 34.

In the preferred embodiment, the internal passageway 34 contains a support 36 for retaining a resilient device 38. This support 36 is connected to the wall 32. Preferably, this support 36 rests in a groove in the passageway 34 or against a shoulder 40 in the passageway 34 and takes the form of an expandable "C" ring. In all cases the support 36 has an outer support piece 42 and a central opening 44 to allow the free flow of gas.

In the preferred embodiment, a resilient device 38 lies distally to, and is supported by, the support 36. Preferably, the resilient device 38 is a light coil spring, although other functional equivalents are operative. The resilient device 38 contains a central opening 46 to allow the free passage of gas.

A plunger assembly is made up of a positioning washer 48 and a plunger 50. The positioning washer 48 is removably or permanently attached to, or is unified with, the plunger 50.

In the preferred embodiment, the support 36 and the resilient device 38 lengthen the life-span of the safety gas valve 4. In this embodiment, a positioning washer 48 and a plunger 50 lie distally to, and the positioning washer 48 is supported by, the resilient device 38. In the non-preferred embodiment, the positioning washer 48 and the plunger 50 are not supported by a resilient device 38.

The positioning washer 48 contains solid areas 52 and a plurality of passageways 54 between the solid areas 52 to allow for the passage of gas. The solid areas 52 may be made of a plate and there may be a plurality of passageways 54 passing through the plate. The solid areas 52 may be made up of a plurality of arms 52 and there may be a plurality of passageways 54 between the arms 52. The solid areas 52 extend to a point just central to the wall 32 so as to maintain the center point of the washer 48 at the center of the internal passageway 34 while not creating friction between the positioning washer 48 and the wall 32.

The casing wall 32 contains a seat 56 which is preferably tapered and which extends around the inner circumference of the wall 32 of the casing 20. The distal surface of this seat 56 is smooth.

Figure 1:
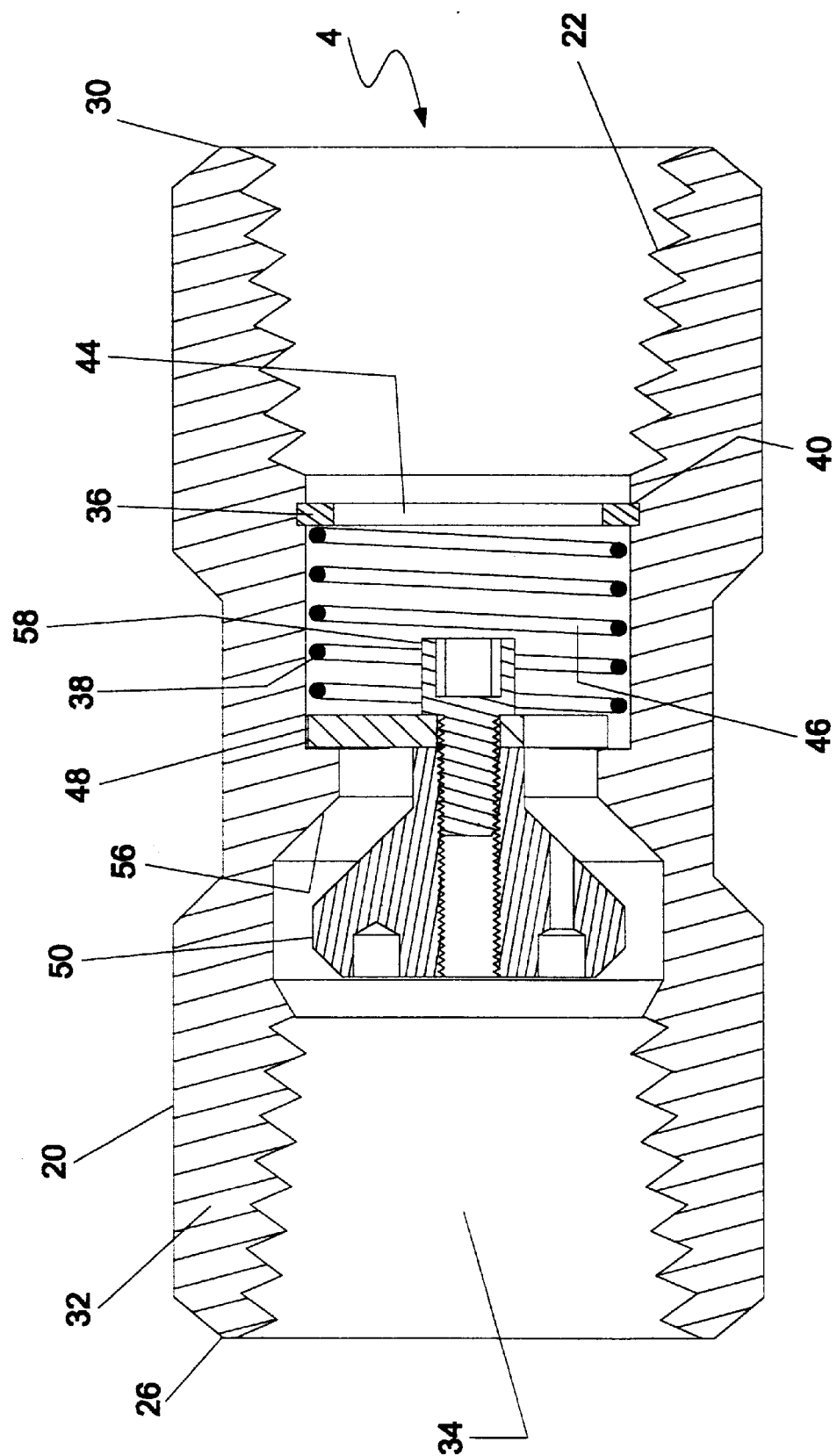
FIG. 1 is a cross-sectional view of the valve of this invention in the passive position wherein the discharge orifice is an internal passageway in the plunger.
Figure 2:
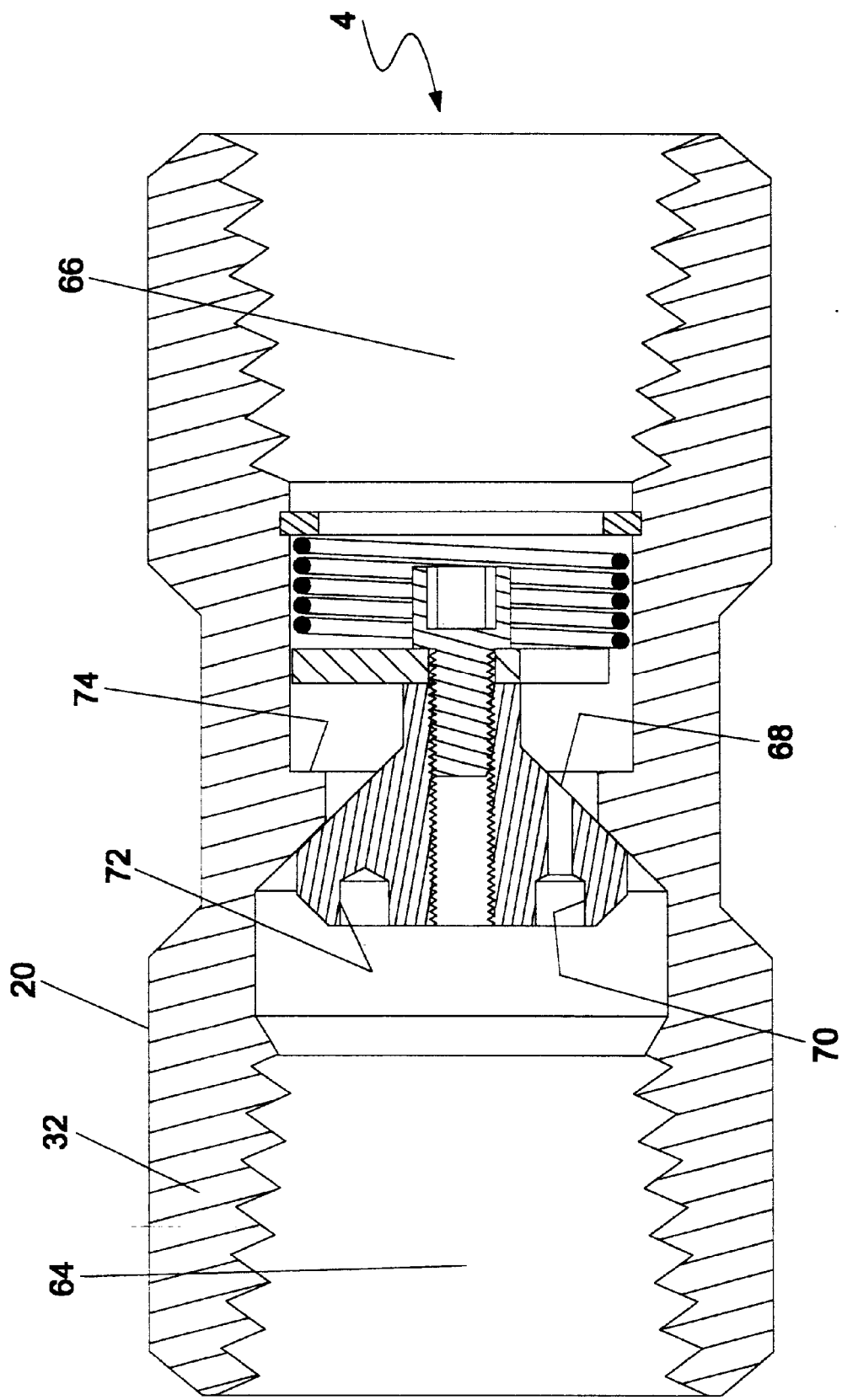
FIG. 2 is a cross-sectional view of the valve of this invention in the active position wherein the discharge orifice is an internal passageway in the plunger.
Figure 3:
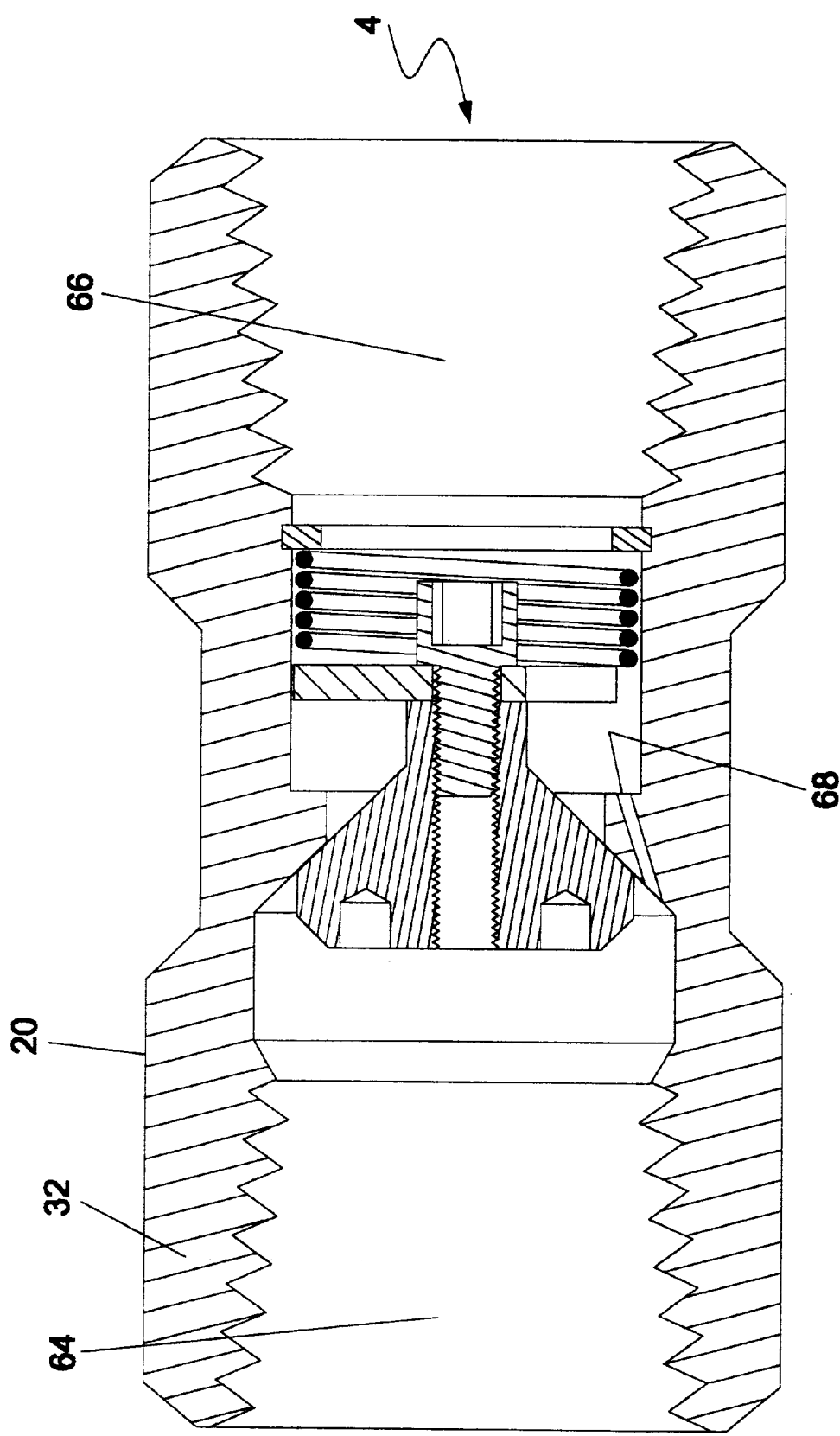
FIG. 3 is a cross-sectional view of the valve of this invention in the active position wherein the discharge orifice is an internal passageway in the wall of the casing.
Figure 6:
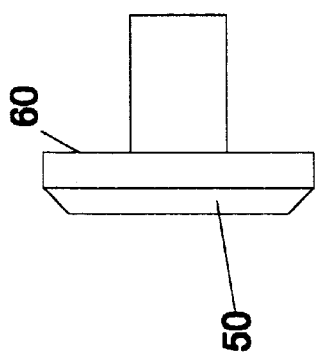
FIG. 6 is an elevational view of a third form of plunger used in this invention.
Figure 5:
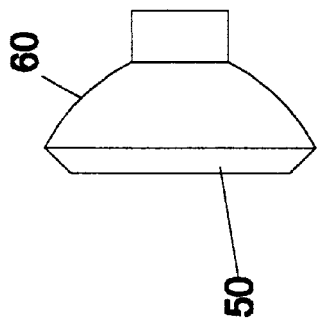
FIG. 5 is an elevational view of a second form of plunger used in this invention.
Figure 4:
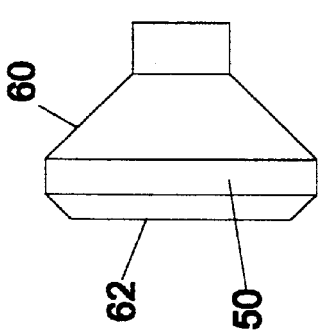
FIG. 4 is an elevational view of one form of plunger used in this invention.
Figure 8:
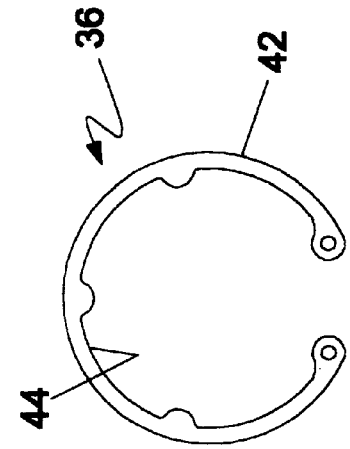
FIG. 8 is a plan view of a support for retaining a resilient device used in the valve of this invention.
Figure 7:
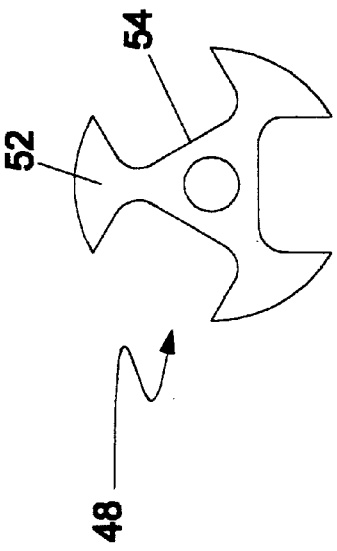
FIG. 7 is a plan view of a positioning washer used in this invention.
Figure 9:
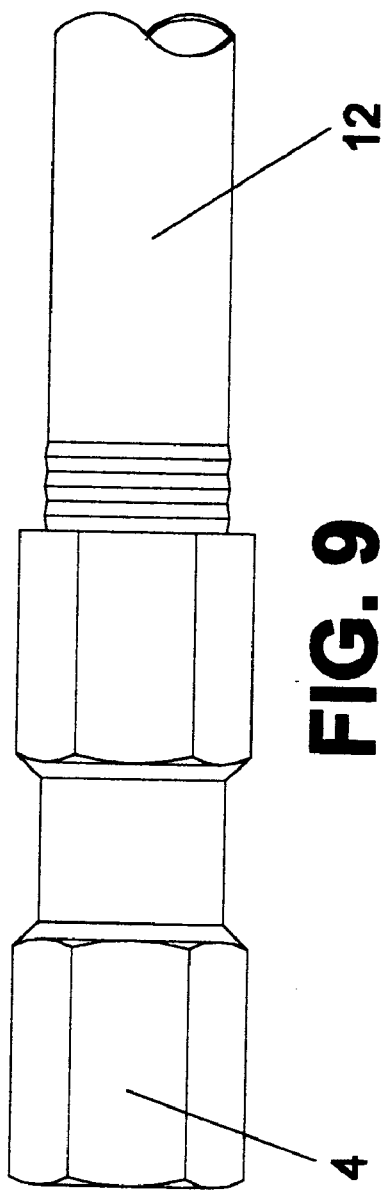
FIG. 9 is an elevational view of a valve of this invention permanently attached to a flexible hose by means of a crimping ring.
Figure 10:
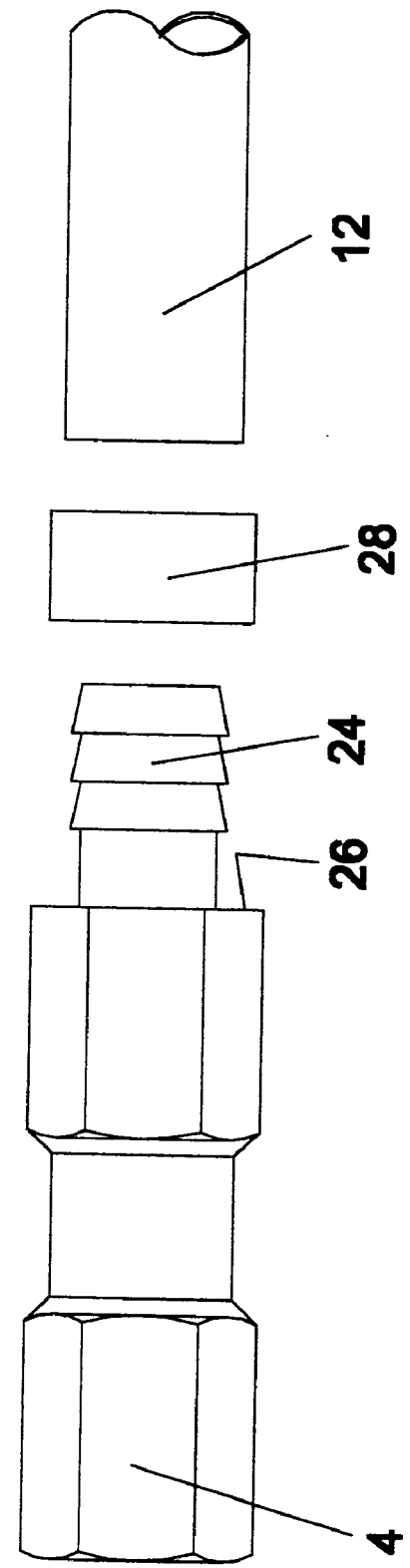
FIG. 10 is an exploded view of a valve of this invention permanently attached to a flexible hose by means of a crimping ring.

A plunger 50 is removably attached to the positioning washer 48. Preferably this connection is accomplished by means of a connecting device 58 such as a bolt or other threaded means passing through the positioning washer 48 into the plunger 50. The connecting device 58 and the positioning washer 48 may be made of a single piece. Alternatively, the plunger 50 and the positioning washer 48 may be made of a single piece. As a second alternative, the plunger 50 is permanently connected to the positioning washer 48. This may be brought about by using a rivet, pressing the plunger 50 and positioning washer 48 together using an interference fit, adhering the plunger 50 and positioning washer 48 to each other using a suitable adhesive, or using a non-removable snap fit. The plunger 50 has a proximal surface 60 which is shaped such as to allow a snug fit against the seat 56 of the casing wall 32. Preferably this surface 60 is conical as shown in FIG. 4 or curved as shown in FIG. 5, but straight surfaces 60 as shown in FIG. 6 will operate for this function. The seat 56 will have a tapered, curved, or flat shape to best accommodate the contour of the proximal surface 60 of the plunger 50. The distal surface 62 of the plunger 50 may be any convenient shape, although round and flat are the preferred shapes.

When the plunger 50 is seated against the seat 56, the valve 4 is divided into a distal compartment 64 and a proximal compartment 66. A discharge orifice 68 in the form of an internal passageway extends from the proximal surface 60 of the plunger 50 to an enlarged opening 70 on the distal surface 62 of the plunger 50. This enlarged opening 70 has a corresponding opening 72 on the opposite side of the center point of the plunger 50 equidistant from the center point. These two openings 70 72 accommodate a turning tool to allow easy insertion and removal of the plunger 50/positioning washer 48 assembly. Alternatively, a discharge orifice 68 in the form of an internal passageway passes through the wall 32 of the casing 20 to connect the distal 64 and proximal 66 compartments.

During normal operation of the compressed gas system 2, gas flows distally through the central openings 44 46 of the support 36 and the resilient device 38. Gas flows distally freely through the passageways 54 of the positioning washer 48 and distally between the plunger 50 and the casing wall 32 causing a buildup of gas pressure in the flexible hose 12 distal to the valve 4. This gas pressure can be used to operate gas powered devices 18 by applying the device to the piece to be worked on and turning on the device.

The casing wall 32 contains a step 74 to limit distal movement of the plunger 50/positioning washer 48 assembly while the valve 4 is in its passive position.

In the event of a sudden loss of gas pressure proximal to the valve 4 due to, for example, routine use of the quick-disconnect valve 10, accidental uncoupling, failure of the quick-disconnect valve 10, or a break in the primary conduit 8 adjacent to the quick-disconnect valve 10, the pressure proximal to the valve 4 decreases suddenly. The pressure distal to the valve 4 causes the proximal surface 60 of the plunger 50 to be forced against the surface of the seat 56, This dramatically reduces the proximal flow of gas past the valve 4 and prevents the conventional loud noise and whipping of the proximal end 14 of the hose 12 commonly associated with sudden loss of pressure. The gas distal to the valve 4 flows gradually through the discharge orifice 68 until the pressure distally of the valve 4 reaches atmospheric pressure.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A safety gas valve device comprising an outer casing having a proximal end and a distal end and comprising a wall and an internal passageway wherein the internal passageway contains:
   a) a positioning washer which contains solid areas and a plurality of passageways which allow for the free movement of gas,
   b) a seat in the wall of the casing,
   c) a plunger connected to the positioning washer, which plunger has a distal surface and a proximal surface, which proximal surface is shaped to fit snugly against the seat of the casing forming a proximal compartment and a distal compartment, and an air discharge orifice extending between the proximal compartment and the distal compartment.

2. The safety gas valve device of claim 1, wherein the plunger is removeably connected to the positional washer.

3. The safety gas valve device of claim 1, wherein the plunger and positioning washer are made of a single piece.

4. The safety gas valve device of claim 1, wherein the plunger is permanently connected to the positioning washer.

5. The safety gas valve device of claim 1, wherein the air discharge orifice is an internal passageway in the wall of the outer casing.

6. The safety gas valve device of claim 1, wherein the air discharge orifice is an internal passageway through the plunger.

7. The safety gas valve device of claim 1, further comprising
   d) a support connected to the wall, which support contains an outer support piece and a central opening,
   e) a resilient device resting against, and distal to, the support, which resilient device abuts and is proximal to the positioning washer, and which device contains a central opening.

8. The safety gas valve device of claim 7, wherein the air discharge orifice is an internal passageway in the wall of the outer casing.

9. The safety gas valve device of claim 7, wherein the air discharge orifice is an internal passageway through the plunger.

10. The safety gas valve device of claim 7, wherein the resilient device is a coil spring.

11. A combination comprising the safety gas valve device of claim 1 connected to a flexible hose.

12. A combination comprising the safety gas valve device of claim 7 connected to a flexible hose.

13. A combination comprising a source of compressed gas, a primary conduit for carrying compressed gas, at least one flexible hose having a proximal end and a distal end connected to the primary conduit by a quick-disconnect mechanism, a gas-powered device located at the distal end of the flexible hose, and the gas safety valve device of claim 1 attached to the flexible hose near the proximal end of the flexible hose.

14. A combination comprising a source of compressed gas, a primary conduit for carrying compressed gas, at least one flexible hose having a proximal end and a distal end connected to the primary conduit by a quick-disconnect mechanism, a gas-powered device located at the distal end of the flexible hose, and the gas safety valve device of claim 7 attached to the flexible hose near the proximal end of the flexible hose.

15. The combination of claim 13, wherein the gas-powered device is a tool.

16. The combination of claim 14, wherein the gas-powered device is a tool.

17. The combination of claim 15, wherein the tool has a distal end and has a recprocating linear component or a rotating component at the distal end.

18. The combination of claim 16, wherein the tool has a distal end and has a reciprocating linear component or a rotating component at the distal end.

19. A method which comprises operationally applying the gas-powered device of the combination of claim 13 to a piece to be worked on and turning on the device.

20. A method which comprises operationally applying the gas-powered device of the combination of claim 14 to a piece to be worked on and turning on the device.

* * * * *